US010215858B1

(12) United States Patent
Klein et al.

(10) Patent No.: US 10,215,858 B1
(45) Date of Patent: Feb. 26, 2019

(54) DETECTION OF RIGID SHAPED OBJECTS

(71) Applicant: Google LLC, Mountain View, CA (US)

(72) Inventors: Greg Joseph Klein, Mountain View, CA (US); Arshan Poursohi, Mountain View, CA (US); Sumit Jain, Mountain View, CA (US); Daniel Aden, Mountain View, CA (US)

(73) Assignee: Google LLC, Mountain View, CA (US)

( * ) Notice: Subject to any disclaimer, the term of this patent is extended or adjusted under 35 U.S.C. 154(b) by 244 days.

(21) Appl. No.: 15/199,864

(22) Filed: Jun. 30, 2016

(51) Int. Cl.
*H04N 7/18* (2006.01)
*G01S 17/89* (2006.01)
*G06T 7/00* (2017.01)
*G06T 7/20* (2017.01)

(52) U.S. Cl.
CPC .............. *G01S 17/89* (2013.01); *G06T 7/004* (2013.01); *G06T 7/0051* (2013.01); *G06T 7/20* (2013.01)

(58) Field of Classification Search
CPC ....................................................... G01S 17/89
USPC .......................................................... 348/142
See application file for complete search history.

(56) References Cited

U.S. PATENT DOCUMENTS

| | | |
|---|---|---|
| 5,153,560 A | 10/1992 | Ichikawa |
| 6,380,882 B1 | 4/2002 | Hegnauer |
| 6,442,419 B1 | 8/2002 | Chu |
| 6,462,663 B1 | 10/2002 | Wilson |
| 6,963,354 B1 | 11/2005 | Scheps |
| 6,967,674 B1 | 11/2005 | Lausch |
| 7,532,113 B2 | 5/2009 | Horvitz |
| 7,598,865 B2 | 10/2009 | Zhang |
| 7,679,561 B2 | 3/2010 | Elwell, Jr. |
| 8,320,939 B1 | 11/2012 | Vincent |
| 8,386,422 B1 | 2/2013 | Kadous |
| 8,699,800 B1 * | 4/2014 | Chau ................. G06F 17/30265 382/201 |
| 8,849,867 B1 | 9/2014 | Pilloff |
| 9,052,721 B1 * | 6/2015 | Dowdall .............. G05D 1/0272 |
| 9,523,772 B2 * | 12/2016 | Rogan ................... G01S 7/4802 |
| 9,699,583 B1 * | 7/2017 | Lyren ...................... H04S 7/303 |
| 2004/0261501 A1 * | 12/2004 | Ng-Thow-Hing .......................... G06F 17/5018 73/32 R |
| 2005/0143091 A1 | 6/2005 | Shapira |
| 2005/0246094 A1 | 11/2005 | Moscatiello |
| 2006/0061566 A1 * | 3/2006 | Verma ..................... G06T 17/00 345/419 |
| 2006/0222207 A1 | 10/2006 | Balzer |

(Continued)

*Primary Examiner* — Leron Beck
(74) *Attorney, Agent, or Firm* — McDonnell Boehnen Hulbert & Berghoff LLP (57) ABSTRACT

Examples relating to the detection of rigid shaped objects are described herein. An example method may involve a computing system determining a first point cloud representation of an environment at a first time using a depth sensor positioned within the environment. The computing system may also determine a second point cloud representation of the environment at a second time using the depth sensor. This way, the computing system may detect a change in position of a rigid shape between a first position in the first point cloud representation and a second position in the second point cloud representation. Based on the detected change in position of the rigid shape, the computing system may determine that the rigid shape is representative of an object in the environment and store information corresponding to the object.

18 Claims, 7 Drawing Sheets

(56) References Cited

U.S. PATENT DOCUMENTS

| | | |
|---|---|---|
| 2006/0265202 A1* | 11/2006 | Muller-Fischer .......................... G06F 17/5009 703/6 |
| 2009/0102719 A1 | 4/2009 | Lin |
| 2010/0235129 A1 | 9/2010 | Sharma |
| 2015/0213646 A1* | 7/2015 | Ma .......................... G06T 17/20 345/420 |
| 2015/0316648 A1* | 11/2015 | Nakahata ................ G01S 17/06 356/3.11 |
| 2017/0219336 A1* | 8/2017 | Kurtz ................ G01B 9/02058 |

\* cited by examiner

DETECTION OF RIGID SHAPED OBJECTS

BACKGROUND

Physical spaces may be used for retail, manufacturing, assembly, distribution, and office spaces, among others. Over time, the manner in which these physical spaces are designed and operated is becoming more intelligent, more efficient, and more intuitive. As technology becomes increasingly prevalent in numerous aspects of modern life, the use of technology to enhance these physical spaces becomes apparent. Therefore, a demand for such systems has helped open up a field of innovation in sensing techniques, data processing, as well as software and user interface design.

SUMMARY

Example implementations of the present disclosure may relate to the detection of rigid shaped objects. As an example, a computing system may determine a first point cloud representation of an environment at a first time and a second point cloud representation of the environment at a second time using a depth sensor positioned in the environment. This way, the computing system can use the determined point cloud representations to detect a change in position of a rigid shape between a first position in the first point cloud representation and a second position in the second point cloud representation. The computing system may also determine the detected rigid shape is representative of an object in the environment based on the detected change in position of the rigid shape and store information corresponding to the detected object.

In one aspect, a method is provided. The method may include determining, at a computing system using at least one depth sensor positioned within an environment, a first point cloud representation of the environment at a first time, and determining, at the computing system using the at least one depth sensor, a second point cloud representation of the environment at a second time. The method may also include detecting a change in position of a rigid shape between a first position in the first point cloud representation and a second position in the second point cloud representation, and based on the detected change in position of the rigid shape, determining that the rigid shape is representative of an object in the environment. The method may further include storing, by the computing system, information corresponding to the object.

In another aspect, a computing system is provided. The computing system may include one or more processors, and a non-transitory computer-readable medium, configured to store instructions, that when executed by the one or more processors, cause the computing system to perform functions. The functions may include determining, using at least one depth sensor positioned within an environment, a first point cloud representation of the environment at a first time, and determining, using the at least one depth sensor, a second point cloud representation of the environment at a second time. The functions may further include detecting a change in position of a rigid shape between a first position in the first point cloud representation and a second position in the second point cloud representation, and based on the detected change in position of the rigid shape, determining that the rigid shape is representative of an object in the environment. The functions may also include storing information corresponding to the object.

In yet another aspect, a non-transitory computer-readable medium configured to store instructions, that when executed by a computing system, cause the computing system to perform functions. The functions may include determining, using at least one depth sensor positioned within an environment, a first point cloud representation of the environment at a first time and determining, using the at least one depth sensor, a second point cloud representation of the environment at a second time. The functions may include detecting a change in position of a rigid shape between a first position in the first point cloud representation and a second position in the second point cloud representation, and based on the detected change in position of the rigid shape, determining that the rigid shape is representative of an object in the environment. The functions may also include storing information corresponding to the object.

In a further aspect, a system comprising means for detecting rigid shaped objects is provided. The system may include means for determining, using at least one depth sensor positioned within an environment, a first point cloud representation of the environment at a first time and means for determining, using the at least one depth sensor, a second point cloud representation of the environment at a second time. The system may further include means for detecting a change in position of a rigid shape between a first position in the first point cloud representation and a second position in the second point cloud representation, and based on the detected change in position of the rigid shape, means for determining that the rigid shape is representative of an object in the environment. The system may also include means for storing information corresponding to the object.

These as well as other aspects, advantages, and alternatives will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative implementations described in the detailed description, figures, and claims are not meant to be limiting. Other implementations may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Additionally, in this disclosure, unless otherwise specified and/or unless the particular context clearly dictates otherwise, the terms "a" or "an" means at least one, and the term "the" means the at least one.

A computing system configured to analyze aspects of an environment can use sensor data from at least one depth sensor (e.g., LIDAR) positioned in the environment to determine point cloud representations that depict measurements of the environment. Particularly, a point cloud representation can correspond to a compilation of data points arranged in a manner that depicts the general layout of an environment, including indicating the positions and sizes of structures and objects located within the environment. As such, the computing system may develop point cloud representations using sets of incoming sensor data in order to analyze the environment, including for object recognition and other possible processes.

In some instances, after determining a point cloud representation, a computing system may identify clusters of data points within the point cloud representation that potentially correspond to surfaces of structures or objects in the environment. Particularly, a cluster of data points can include a large number of data points arranged within a threshold distance from each other in a configuration that reflects the exterior of a structure measured by the sensors. However, because a point cloud representation often includes a large number of data points depicting the various surfaces in the environment with some structures even appearing to overlap others in the representation, a single point cloud representation often fails to provide enough information for the computing system to clearly identify clusters of data points that correspond to the same surface of a given object or structure. Rather, when analyzing a single point cloud representation, the computing system may inaccurately associate data points that correspond to different structures in the environment (e.g., different objects) as corresponding to the same object and/or make other inaccurate interpretations using the sensor data.

To reduce inaccurate association of data points, a computing system may be configured to perform one or more rigid body object detection processes described herein. For example, a computing system may determine an initial point cloud representation that depicts the environment at a first time (e.g., a first point cloud representation), and also determine one or more subsequent point cloud representations that depict the environment at subsequent times (e.g., a second point cloud representation of the environment at a second time). This way, the computing system may use the series of point cloud representations to initially detect clusters of data points that are arranged in a rigid shaped configuration and further measure movements of these clusters to determine if the clusters maintain the same rigid shape configuration through multiple sets of sensor data captured at different times. As a result, the computing system may determine when data points depicting a rigid shape in the point cloud representations likely represent measurements of an actual physical object in the environment. For instance, sensor measurements of a chair may result in data points arranged in a manner within a point cloud representation that depict the rigid structures of the legs, base, and back of the chair. As such, the computing system may detect and measure any movements of clusters of the data points depicting these rigid features in a series of point cloud representations to determine if the clusters maintain the configuration of a chair. The computing system may perform a similar process to detect objects with different exterior configurations.

In some instances, the computing system may be configured to measure position changes of detected clusters that appear to maintain a particular rigid shape between a first position in the first point cloud representation and a second position in the second point cloud representation. For example, the computing system may detect a translation or rotation of the rigid shape depiction that potentially corresponds to an object in the environment using multiple point cloud representations. In addition to initially detecting rigid shapes using multiple point cloud representations, the computing system may also determine other information about the rigid shapes using point cloud representations, such as determining an approximate time when a detected rigid shape appeared to have entered or leave the environment. The computing system can use this process or similar processes to detect rigid shapes within determined point cloud representations and measure changes in the environment over time.

In some implementations, the computing system may further determine whether detected clusters of data points that appear to form and maintain rigid shape configurations in point cloud representations correspond to physical objects in the environment. For example, a computing system may use a database that contains information about various objects to assist in determining whether a detected rigid shape likely corresponds to an object in the environment. Particularly, the database may provide the computing system with access to information that enables comparisons between various aspects of the detected rigid shape with previously identified objects, including comparing information detailing shapes and sizes of objects that may be potentially detected within the environment. This way, the computing system can compare a detected rigid shape to the rigid shapes of objects within the database to determine whether or not the detected rigid shape potentially matches the shape of an actual object. Additionally, in some instances, the computing system may be configured to obtain additional information about a detected rigid shape and use the additional information to compare to information stored in the database to associate the detected rigid shape with a type of object. In some instances, the computing system may update the database to reflect information corresponding to newly detected objects, including updating the database to include size, shape, and location information of detected objects, for example. A computing system can search one or more databases for other information to assist in rigid shape object detection and recognition within examples.

In some implementations, when performing a rigid shape detection process, a computing system may determine that a cluster of data points within the first point cloud representation likely does not exhibit qualities within the measurements that indicate the cluster of data points correspond to a rigid-shaped object in the environment after performing further analysis on the cluster using a subsequent point cloud representation of the environment. For instance, the computing system may detect that a cluster of data points displays a change in size after analyzing the cluster using a series of point cloud representations and further determine that the cluster of data points likely does not correspond to a rigid shaped object. However, the computing system may be configured to cause a sensor system (e.g., camera system) to obtain additional information regarding the detected cluster of data points to assist in determining whether the cluster of data points still corresponds to an object that may not have a constant rigid shape. As such, the computing system may use other processes to detect objects that do not typically display rigid bodied shape characteristics (e.g., clothing, curtains).

In another example, a computing system may query one or more computing devices when determining whether a detected rigid shape corresponds to an object in the environment. Particularly, as an example implementation, the computing system may send a query to a computing device (e.g., a smartphone, robotic device) positioned in the environment requesting for additional information regarding a detected rigid shape. For instance, the computing system may transmit an email or message within an application to a computing device positioned in proximity nearby a detected rigid shape requesting for information regarding the detected rigid shape. This way, the computing system may use any information received back from the computing device when determining whether the detected rigid shape is an object. In some instances, the computing system may be configured to set up a user-approved connection with a given computing device prior transmitting queries to that computing device.

In some implementations, a computing system may also query one or more computing devices to determine additional information about a detected object. For instance, the computing system may utilize a series of point cloud representations to locate objects having rigid bodied shapes in the environment and further query a computing device (e.g., a smartphone) located nearby the objects requesting additional information about the objects. In an example, the computing system may request the computing device to confirm whether the computing system accurately identified a given object detected within the environment. As such, the computing system may use the information provided by the computing device to supplement information about the detected objects and store the information in a database.

In another implementation, the computing system may query a computing device to receive additional information about an object for security or identification reasons. As such, the computing system may use information provided by the computing device to identify the object. Additionally, a computing system may perform other processes or operations when attempting to detect and determine rigid shaped objects in the environment in other examples.

Figure 1:
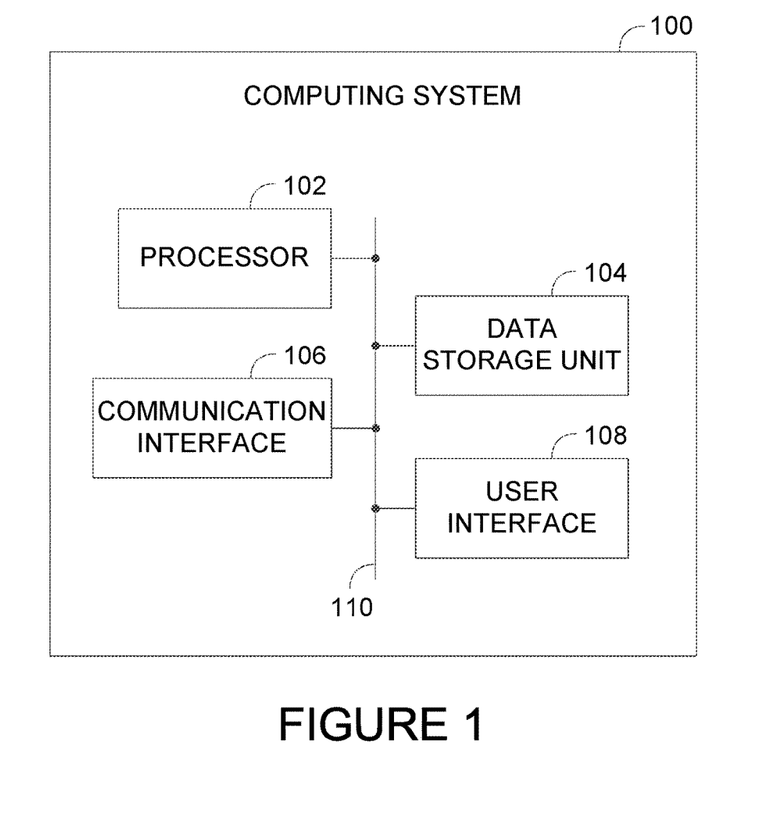
FIG. 1 is a simplified block-diagram of an example computing system.

Referring now to the Figures, FIG. 1 is a simplified block-diagram of an example computing system 100 that can perform various acts and/or functions, such as those described in this disclosure. Computing system 100 may include components, such as processor 102, data storage unit 104, communication interface 106, and/or user interface 108. The components can be connected to each other (or to another device, system, or other entity) via connection mechanism 110, and can include more or less components in other example implementations. In this disclosure, the term "connection mechanism" means a mechanism that facilitates communication between two or more devices, systems, or other entities. For instance, a connection mechanism can be a simple mechanism, such as a cable or system bus, or a relatively complex mechanism, such as a packet-based communication network (e.g., the Internet). In some instances, a connection mechanism can include a non-tangible medium (e.g., where the connection is wireless).

Processor 102 may include a general-purpose processor (e.g., a microprocessor) and/or a special-purpose processor (e.g., a digital signal processor (DSP)). Computing system 100 may include a combination of processors within examples.

Data storage unit 104 may include one or more volatile, non-volatile, removable, and/or non-removable storage components, such as magnetic, optical, or flash storage, and/or can be integrated in whole or in part with processor 102. As such, data storage unit 104 may take the form of a non-transitory computer-readable storage medium, having stored thereon program instructions (e.g., compiled or non-compiled program logic and/or machine code) that, when executed by processor 102, cause computing system 100 to perform one or more acts and/or functions, such as those described in this disclosure. Computing system 100 can be configured to perform one or more acts and/or functions, such as those described in this disclosure. Such program instructions can define and/or be part of a discrete software application. In some instances, computing system 100 can execute program instructions in response to receiving an input, such as from communication interface 106 and/or user interface 108. Data storage unit 104 may also store other types of data, such as those types described in this disclosure.

Communication interface 106 can allow computing system 100 to connect to and/or communicate with another other entity according to one or more protocols. In an example, communication interface 106 can be a wired interface, such as an Ethernet interface or a high-definition serial-digital-interface (HD-SDI). In another example, communication interface 106 can be a wireless interface, such as a cellular or WI-FI interface. A connection can be a direct connection or an indirect connection, the latter being a connection that passes through and/or traverses one or more entities, such as such as a router, switcher, or other network device. Likewise, a transmission can be a direct transmission or an indirect transmission.

User interface 108 can facilitate interaction between computing system 100 and a user of computing system 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing system 100 and the user of the computing device system.

Computing system 100 may be configured to analyze aspects of an environment. For instance, computing system 100 may receive and utilize data from sensors positioned in various types of environments, such as manufacturing facilities and distribution facilities. As such, computing system 100 can use information provided by a variety of types of sensors, such as depth sensors, cameras, or gauges. Example sensors can include motion-capture (Mocap) sensors, or LIDAR sensors, generic force sensors, proximity sensors, motion sensors (e.g., an inertial measurement units (IMU), gyroscopes, and/or accelerometers), load sensors, position sensors, thermal imaging sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others. Sensors can have a fixed-stationary position in the environment or can also operate in a non-stationary manner. For example, a robotic device can measure aspects of the environment using sensors that capture data as the robotic device travels. Additionally, computing system 100 may also utilize a clock for time stamping incoming sensor data and information (e.g., information from devices in the environment) in order to align information from different sensors or devices that correspond to the same time.

Computing system 100 can process different types of incoming sensor data. For instance, computing system 100 may determine point cloud representations of the environment using data provided from a depth sensor positioned in the environment. A point cloud representation of the environment may have numerous data points in a coordinate system that correspond to surfaces of objects in the environment. As such, computing system 100 can utilize point cloud representations to determine depth information about an environment, including given positions and sizes of objects detected by a sensor. Computing system 100 may use information provided by sensors to determine various information about objects in the environment, including positions of objects, sizes, and in object recognition, for example.

Additionally, computing system 100 may also communicate and/or control systems operating within an environment, such as a lighting system or audio system. In some instances, computing system 100 can further provide instructions or requests to robotic devices or other computing devices positioned within or nearby the environment. As an example, computing system 100 can provide a query in an email to a computing device that requests additional information regarding a detected rigid shape that potentially corresponds to an object in the environment.

Figure 2:
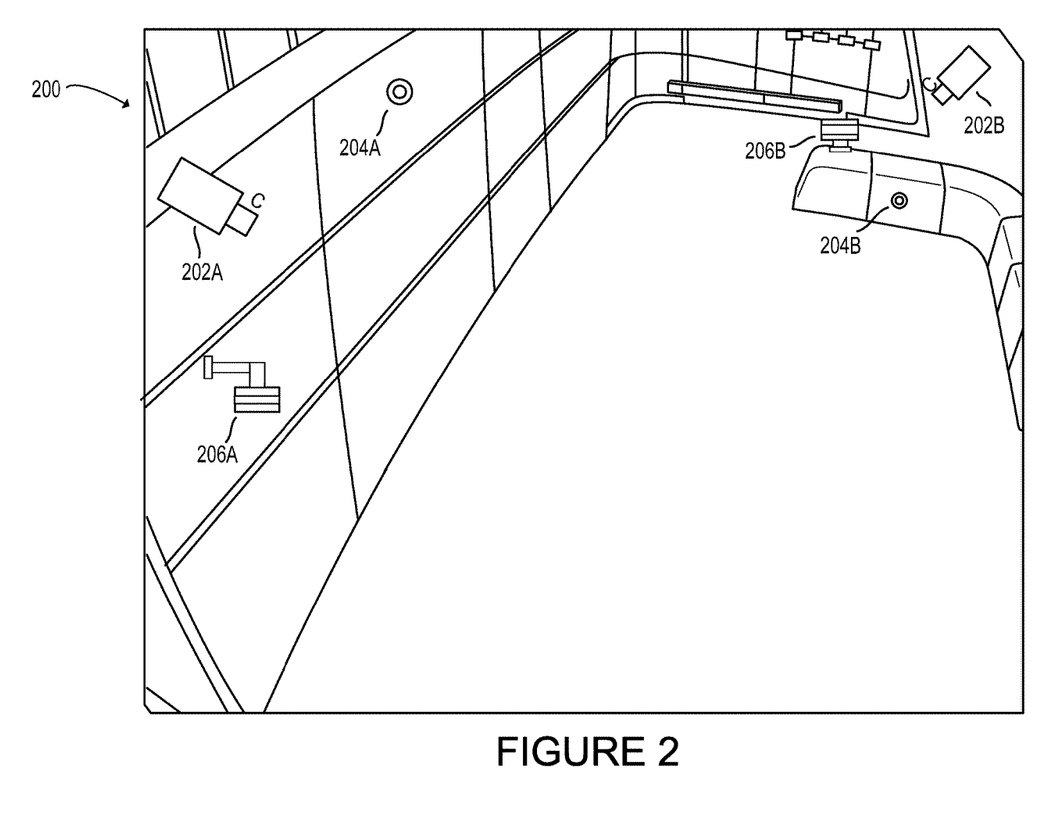
FIG. 2 depicts an example environment.

FIG. 2 depicts an example environment 200 that computing system 100 may detect rigid shaped objects within. Environment 200 is shown as a general space, but may correspond to indoor or outdoor environments, such as manufacturing facilities, distribution centers, or other possible locations. As shown, environment 200 can include sensors, such as camera 202A, camera 202B, microphone 204A, microphone 204B, depth sensor 206A, and depth sensor 206B. In other examples, environment 200 may include more or less sensors. For instance, environment 200 may include a set of LIDAR sensors (e.g., ten LIDAR sensors) having fixed positions at different locations of environment 200.

Various sensors, such as camera 202A and depth sensor 206A, can provide information to computing system 100 in a periodic and/or continuous manner via a wired and/or wireless connection. For instance, cameras 202A-202B may provide images and/or video of environment 200 and may be configured to focus upon particular aspects of environment 200. As such, the various sensors in environment 200 can provide different types information to computing system 100 for computing system 100 to utilize to perform operations, such as detecting rigid shaped objects.

Microphones 204A-204B can capture audio in environment 200 and relay the audio information to computing system 100. As such, computing system 100 can use information provided by microphones 204A-204B to assist in performing operations (e.g., detecting objects in environment 200).

Depth sensors 206A-206B can correspond to laser-based sensors (e.g., LIDAR), camera-based sensors (e.g., RGB cameras), or other types of depths sensors. For instance, depth sensor 206A and depth sensor 206B may correspond to LIDAR sensors having fixed positions in environment 200 that can produce point clouds made up of data points (e.g., 60,000 data points) that represent the surfaces of nearby objects. As such, depth sensor 206A and depth sensor 206B may provide information to computing system 100 and/or may operate as a system to provide merged information (e.g., a merged point cloud) to computing system 100. In some instances, computing system 100 may receive information from depth sensor 206A and depth sensor 206B at the same time and merge the information and/or receive the information at staggered times. Computing system 100 may use various processes to merge and utilize information from various sensors in environment 200.

As discussed above, computing system 100 may receive information from sensors and determine representations of environment 200. For example, computing system 100 may receive information from depth sensor 206A and determine a point cloud representation corresponding to environment 200 for that particular time. Similarly, in some instances, computing system 100 can use a combination of sensor data provided by all or a set of sensors positioned in environment 200 to develop information (e.g., point cloud representation) corresponding to environment 200. As an example, computing system 100 may receive and use information from depth sensor 206A and depth sensor 206B to generate point cloud representations of environment 200.

Figure 3:
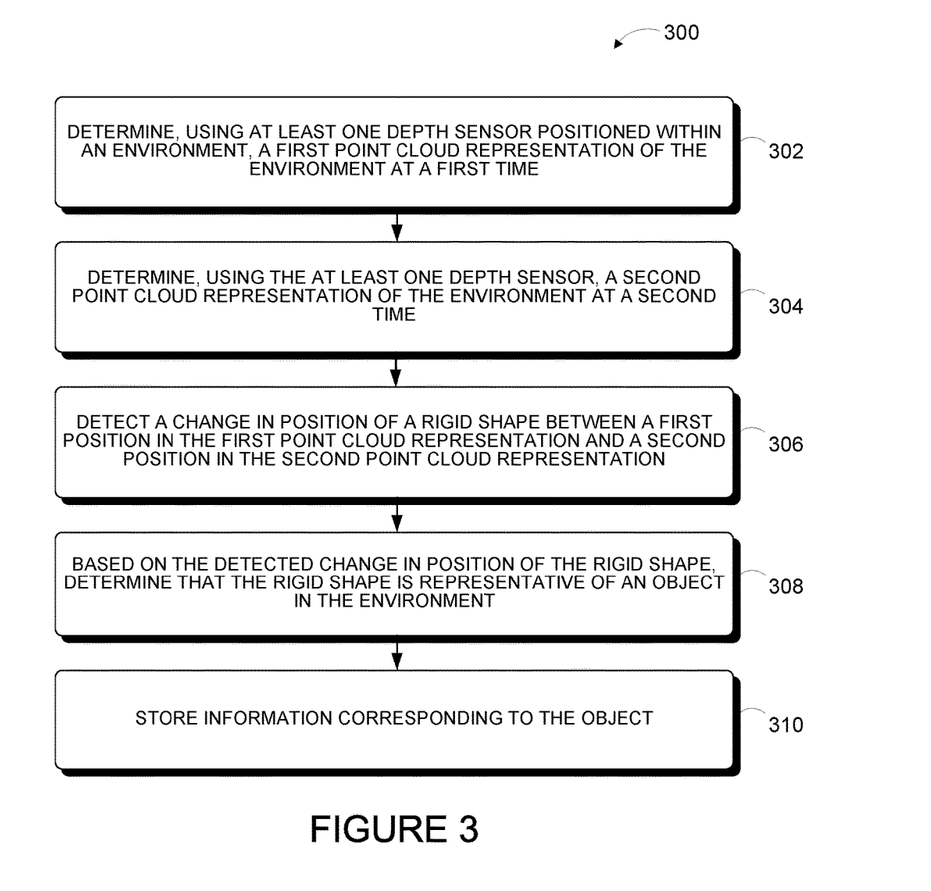
FIG. 3 is a flowchart of example method for the detection of a rigid shaped object.

FIG. 3 is a flowchart of example method 300 for the detection of a rigid shaped object. Method 300 represents an example method that may include one or more operations, functions, or actions, as depicted by one or more of blocks 302, 304, 306, 308, and 310, each of which may be carried out by computing system 100 described in FIG. 1, but other systems can also be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by a processor (e.g., processor 102) for implementing specific logical functions or steps in the process. The program code may be stored on any type of computer readable medium, for example, such as a storage device including a disk or hard drive (e.g., data storage unit 104).

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, a computing system may perform one or more blocks of method 300.

At block 302, method 300 includes determining, using at least one depth sensor positioned within an environment, a first point cloud representation of the environment at a first time. As noted above, computing system 100 may receive information corresponding to environment 200 via sensors operating within or nearby environment 200, including point cloud data from depth sensors 206A-206B. When receiving incoming sensor data, computing system 100 may associate a time stamp with information received from sensors based on the time that the sensors captured the information and/or based on the time at which computing system 100 received the information. As a result, computing system 100 can receive sensor data from one or more depth sensors and determine a first point cloud representation of environment 200 associated with a first time. In a similar manner, computing system 100 may also determine and associate subsequent point cloud representations of environment 200 with subsequent times (e.g., a second point cloud representation at a second time).

At block 304, method 300 may include determining, using the at least one depth sensor, a second point cloud representation of the environment at a second time. Similar to determining the first point cloud representation of environment 200, computing system 100 may receive additional sensor data (e.g., a second set) from the depth sensor and determine at least a second point cloud representation of environment 200 at a second time. In particular, the second point cloud representation of environment 200 at may represent the environment at a time subsequent to the first determined point cloud representation of environment 200. This way, computing system 100 may develop a series of point cloud representations that contain information depicting changes in environment 200 over the duration of time that the point cloud representations correspond to respectively.

Although computing system 100 may detect changes in environment 200 by determining a first point cloud representation corresponding to a first time and a second point cloud representation corresponding to a second time, computing system 100 may also determine and utilize additional point cloud representations at further subsequent times. For instance, computing system 100 may determine and utilize a third point cloud representation that depicts environment 200 at a third time and a fourth point cloud representation that depicts environment 200 at a fourth time. As such, computing system 100 may determine and utilize any number of point cloud representations that correspond to an environment over a period of time. In some examples, computing system 100 may continuously determine point cloud representations as sensor data is received from sensors.

Additionally, computing system 100 can receive and use information from other sensors positioned in environment 200. For instance, computing system 100 may use additional information from sensors to supplement determined point cloud representations of environment 200.

At block 306, method 300 includes detecting a change in position of a rigid shape between a first position in the first point cloud representation and a second position in the second point cloud representation. Using determined point cloud representations (e.g., the first and second point cloud representations of environment 200), computing system 100 can detect clusters of data points that appear to display rigid shape characteristics (e.g., arranged in a rigid shape). As such, computing system 100 may determine that these rigid shapes potentially correspond to objects in environment 200.

In some instances, computing system 100 may detect a cluster of data points that appears to initially display a rigid shape that further shows non-dilation parameters (e.g., remaining constant in size and shape) between the first point cloud representation and the second point cloud representation. Computing system 100 may detect changes in positions of rigid shapes in a series of determined point cloud in order to potentially detect rigid shaped objects in environment 200. For example, computing system 100 may detect a rigid shape that potentially corresponds to a physical object in environment 200 based on the rigid shape having a first position in the first point cloud representation and a second position in the second point cloud representation. This way, computing system 100 may detect a potential object based on a rigid shape appearing to have changed positions between the first time and the second time that correspond to the first and second point cloud representations, respectively.

Computing system 100 may detect a change in the position of data points displaying rigid shape characteristics between the first point cloud representation and the second point cloud representation in various ways. For instance, computing system 100 may detect the change in position of data points depicting a rigid shape between the first point cloud representation and the second point cloud representation by detecting a translation of the rigid shape between the first point cloud representation and the second point cloud representation. A translation of the rigid shape may correspond to a change in position of the rigid shape without a change in the orientation of the rigid shape between the different point cloud representations. Similarly, computing system 100 may detect a rotation of the rigid shape between the first point cloud representation and the second point cloud representation. Particularly, computing system 100 can determine that the rigid shape appears to have rotated to some extent (e.g., 180 degrees) between the first point cloud representation and the second point cloud representation of environment 200. In other examples, computing system 100 may detect changes in positions of rigid shapes in other possible ways.

As discussed above, computing system 100 may detect rigid shapes within determined point cloud representations of environment 200. For instance, computing system 100 may detect three-dimensional (3D) shapes that likely correspond to objects that typically have rigid shapes. For instance, computing system 100 may utilize an algorithm that searches for rigid shapes, such as cubes, rectangular shapes, or other rigid shapes that are evident in objects. As an example, computing system 100 may identify clusters of data points depicting rigid shapes that may correspond to a table by detecting data points depicting four legs and a flat surface within point cloud representations. In some instances, computing system 100 may use one or more algorithms that utilize pattern matching across a series of point cloud representations seeking for clusters of points sharing the same general shape. A cluster of points may correspond to data points within point cloud representations that are positioned close together (e.g., within a threshold distance from each other). As such, computing system 100 may associate data points positioned close together as being part of the same cluster and potentially the same object.

At block 308, method 300 may include determining that the rigid shape is representative of an object in the environment based on the detected change in position of the rigid shape. As noted above, computing system 100 may detect rigid shapes within information provided by a depth sensor and/or other sensors in environment 200. In particular, computing system 100 may detect rigid shapes and changes in positions of the detected rigid shapes using the determined point cloud representations (e.g., the first and the second point cloud representations). As such, computing system 100 may further be configured to determine whether a detected rigid shape likely corresponds to an object in environment 200. Within example implementations, computing system 100 may determine that a detected rigid shape corresponds to an object in environment 200 in various ways.

As an example implementation, computing system 100 may determine that the rigid shape is representative of an object in environment 200 based on performing a comparison between a detected rigid shape depicted by data points in a point cloud representation and a database having information about a number of objects, such as a size and shape of the objects. This way, computing system 100 can use the comparison to determine whether the rigid shape is representative of an object. For instance, computing system 100 may determine that the detected rigid shape displays characteristics (e.g., same shape) similar to a stored shape of an object in the database. As a result, computing system 100 may determine that a detected rigid shape actually corresponds or likely corresponds to an object in environment 200 with assistance of the database containing information. In some instances, the database may correspond to a remote computing device and/or exist locally at computing system 100.

In another implementation, computing system 100 may determine whether data points depicting a detected rigid shape correspond to a physical object in environment 200 after acquiring additional information regarding the detected rigid shape. For instance, computing system 100 may first locate and focus upon a rigid shape based on detecting a change in position of the rigid shape between the first point cloud representation and the second point cloud representation of environment 200. After detecting the rigid shape, computing system 100 may gather more information about the rigid shape in various ways.

In some instances, computing system 100 may obtain additional information regarding the detected rigid shape by sending a query or queries to other computing devices requesting for additional information about the detected rigid shape. As an example, computing system 100 may send a query in an email or on an application located on a computing device requesting information about the detected rigid shape. An example query can contain information, such as a description of parameters of the detected rigid shape, requesting for confirmation and/or additional information about the detected rigid shape. In some instances, computing system 100 may limit the transmission of queries to computing devices that have provided previous approval to receive a given query from computing system and/or further limiting the transmission based on locations of a computing device (e.g., transmitting a query to a computing device positioned within a threshold distance from a position of the detected rigid shape in the most recent point cloud representation (e.g., the second point cloud representation of environment 200)).

In other implementations, computing system 100 may acquire additional information regarding a detected rigid shape through using additional information obtained from sensors located in environment 200. For instance, computing system 100 may confirm whether or not a detected rigid shape corresponds to a physical object in environment 200 by utilizing images or video acquired via a camera system positioned in environment 200. As such, images captured of the location of the detected rigid shape may assist computing system 100 to determine whether the detected rigid shape corresponds to an actual object.

In some implementations, computing system 100 may receive information regarding a detected rigid shape using a robotic device. By way of an example, computing system 100 may provide instructions to a robotic device operating in environment 200 to travel to the location of the detected rigid shape and obtain additional information about the detected rigid shape. The robotic device may use a sensor or sensors to obtain information about the detected rigid shape and transmit the information to computing system 100. Computing system 100 may also cause the robotic device to retrieve and/or otherwise manipulate the detected rigid shape (e.g., adjust the position of the detected rigid shape).

Additionally, in some instances, computing system 100 may use the depth sensor to determine additional point cloud representations of the environment at subsequent times in order to detect a trend in motion of the rigid shape in environment 200. This way, computing system 100 can use the detected trend in motion of the rigid shape within the series of point cloud representations to determine that the rigid shape is representative of an object in environment 200. Particularly, computing system 100 may determine that the trend in motion of the rigid shape through the series of point cloud representations likely indicates that the detected rigid shape corresponds to an object in environment 200.

In some instances, additional information may help computing system 100 increase or decrease an estimated likelihood whether a detected rigid shape corresponds to a physical object. For instance, images of an area that corresponds to a detected location of a rigid shape may help a computing system 100 raise the likelihood (e.g., from 60 percent to 80 percent likelihood) that the detected rigid shape is a physical object in environment 200. Furthermore, additional information may be used by computing system 100 to primarily supplement the information within the first point cloud representation and the second point cloud representation.

At block 310, method 300 may include storing information corresponding to the object. As discussed above, computing system 100 may determine that a detected rigid shape corresponds (or likely corresponds) to an object in environment 200. Thus, after determining that the rigid shape is likely an object, computing system 100 may generate and store information about the object, such as information corresponding to a location, position, rigid shape, and size of the object. Computing system 100 may determine the information about the object in various ways, including using previous and/or new determined point cloud representations, other sensor data, and/or other sources of information regarding the object (e.g., information provided by other computing devices in response to queries about the object). Additionally, computing system 100 may measure parameters corresponding to the detected object over time using sensors in environment 200. For instance, computing system 100 can measure parameters, such as thermal properties, state changes, colors, and other possible information corresponding to a detected object.

In some implementations, computing system 100 may store information about the object locally in data storage unit 104 and/or cause (e.g., transmit) the information to be stored at another computing device, such as a remote database. For instance, computing system 100 may contribute information about the object to the database that can be used to perform the comparison to determine whether the detected rigid shape corresponds to an object as previously discussed above. This way, computing system 100 or other computing systems may detect and identify similar objects using a continuously updated database.

Computing system 100 may also use additional sensor data from the depth sensor or other sensors in environment 200 to determine information about the object. For instance, computing system 100 may use images of the object from cameras or additional depth sensors to determine information about the object. Computing system 100 can also request and receive information from other computing devices to supplement and/or alter the information corresponding to the object. For example, computing system 100 can send a query to computing devices (e.g., a smartphone)

requesting information about the object after determining that the rigid shape is likely an object. Similar to prior query examples discussed above, a query can correspond to requests for information about the detected object. Computing system 100 can send emails or queries in other configurations (e.g., query within an application) to one or more computing devices in environment 200.

In some examples, computing device 100 may further provide instructions to other computing devices or systems using the information corresponding to the object. For instance, computing device 100 may provide instructions to a lighting system to adjust lighting in environment 200 based on the object. Computing device 100 may cause the lighting system to manipulate lighting based on various aspects of the object, such as its location or type. Similarly, computing device 100 can cause a system in environment 200 to provide an alert (e.g., sound alert) based on detecting object.

In another example, computing system 100 may provide instructions to a robotic device to perform operations based on the detected object. Computing system 100 may cause the robotic device to obtain additional information corresponding to the detected object, which may involve the robotic device using sensors positioned on the robotic device. For example, the robotic device can relay images or other measurements of the object to computing system 100. Likewise, computing system 100 can cause the robotic device to manipulate the object in some manner, such as adjusting the location or position of the object. The robotic device can rotate, lift, move, or perform other actions on the detected object.

In another example, computing system 100 may maintain a database that includes information regarding objects that have been detected in environment 200. As such, computing system 100 may update the database upon detecting and identifying a new object in environment 200. Computing system 100 may update and refine information within the database based on newly acquired information (e.g., changing previously wrong information about an object upon receiving better sensor information about the object).

In some situations, computing system 100 may detect a potential rigid shape in environment 200 using information from the point cloud representations. However, some potential rigid shapes may correspond to objects that have the ability to change shape or size. For instance, computing system 100 may detect a shape that initially appears to have a rigid form, but later determine that the shape can change size or shape. As such, computing system 100 may further obtain information about the shape to assist in determining whether the shape corresponds to an object that adjusts size and shape easily, such as a cloth or shirt. As a result, computing system 100 may utilize other methods or processes to further determine whether sensor data corresponds to a non-rigid shape (e.g., a shirt or cloth).

Figure 4A:
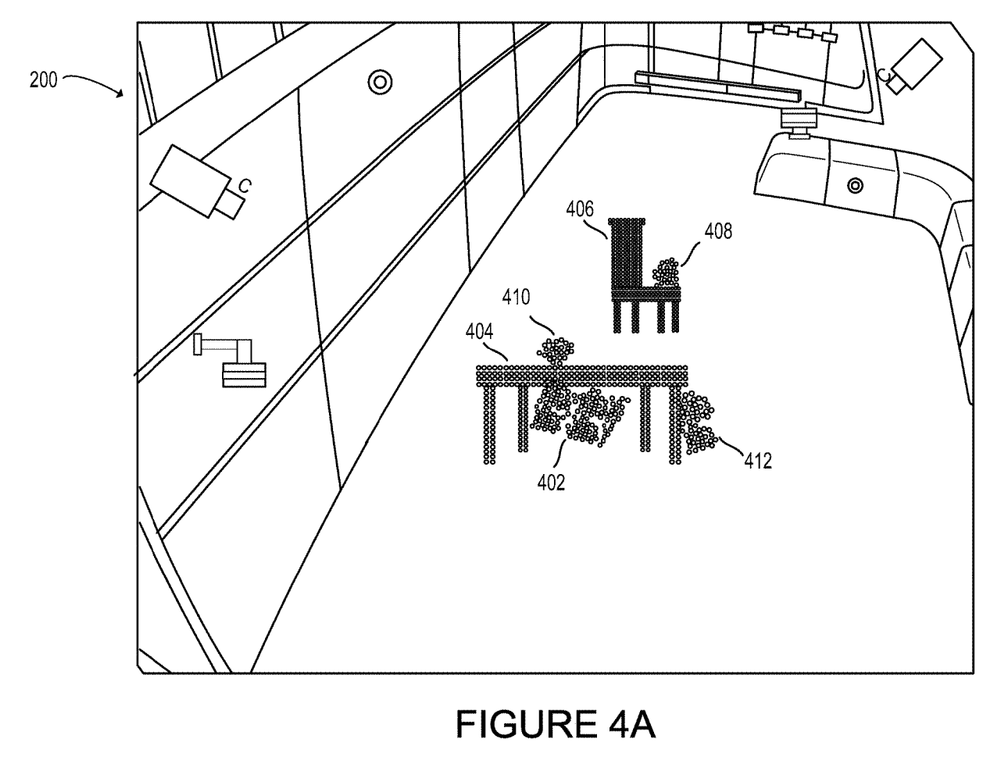
FIG. 4A depicts a first representation of an example environment for use to detect rigid shaped objects.

FIG. 4A depicts a first representation of example environment 200 for use to detect rigid shaped objects. First representation shows example clusters of data points that may correspond to potential objects in environment 200, including cluster 402, cluster 404, cluster 406, cluster 408, cluster 410, and cluster 412. As discussed above, computing system 100 may determine the first point cloud representation using sensor data provided from a sensor or sensors (e.g., LIDAR system) positioned in environment 200 and detect clusters of data points (e.g., clusters 402-412) within the representation that may potentially correspond to measurements of objects in environment 200. The first representation and other representations depicted herein are shown for illustration purposes, and may include more or less data points in other implementations. For instance, a point cloud representation of environment 200 determined by computing system 100 may include a high number data points corresponding to various surfaces in environment 200, including the ground, walls, and other structures (e.g., non-stationary objects, fixed structures).

After determining first representation, computing system 100 may use various processes to detect and identify clusters of data points that potentially correspond to measurements of objects in environment 200. For instance, computing system 100 may utilize a system of algorithms configured to detect certain configurations depicted by data points in the first representation. As such, computing system may be configured to search and detect data points arranged together in a way that may depict an object with a rigid shape in environment 200. However, in some instances, computing system 100 may initially detect a cluster of data points that may appear to correspond to measurements of a rigid shaped object, but later determine that the data points actually correspond to noise in sensor data or a non-rigid object (e.g., clothing, soft shaped objects) that tend to change shape over time, among other possibilities. As such, computing system 100 may use method 300 or similar processes to detect clusters of data points (e.g., clusters 402-412) that potentially correspond to rigid shaped objects in environment 200 and further determine whether the detected clusters actually correspond to measurements of physical objects in environment 200.

As discussed above, computing system 100 may detect clusters of data points within the first representation that may potentially correspond to objects in environment 200. For instance, computing system 100 may detect cluster 402, cluster 404, cluster 406, cluster 408, cluster 410, and cluster 412. However, computing system 100 may inaccurately associate clusters of data points located in approximately the same area of environment 200 as corresponding to the same structure (e.g., same object). Particularly, in some instances, computing system 100 may associate cluster 402, cluster 404, cluster 410, and cluster 412 as part of the same cluster of data points depicting a single structure. Computing system 100 may also be unable to detect any rigid shape configurations within the clusters of data points since cluster 402, cluster 404, cluster 410, and cluster 412 appear to overlap and prevent a clear identification of a rigid shape. Although cluster 404 may correspond to a table positioned in environment 200, computing system 100 may not have the capabilities to identify the rigid shape of the table due to cluster 402, cluster 410, and cluster 412 also appearing in the same location as cluster 404 without using one or more subsequent representations containing subsequent sensor measurements of environment 200.

Similarly, computing system 100 may be unable to determine that cluster 406 includes data points configured in a way that corresponds to a chair within the first representation shown in FIG. 4A. Cluster 408 is shown positioned proximate to cluster 406 and may cause computing system 100 to associate cluster 406 and cluster 408 together in some manner. As such, computing system 100 may require additional sensor measurements (e.g., one or more subsequent representations) to detect and confirm which clusters potentially correspond to rigid shaped objects in environment 200.

Figure 4B:
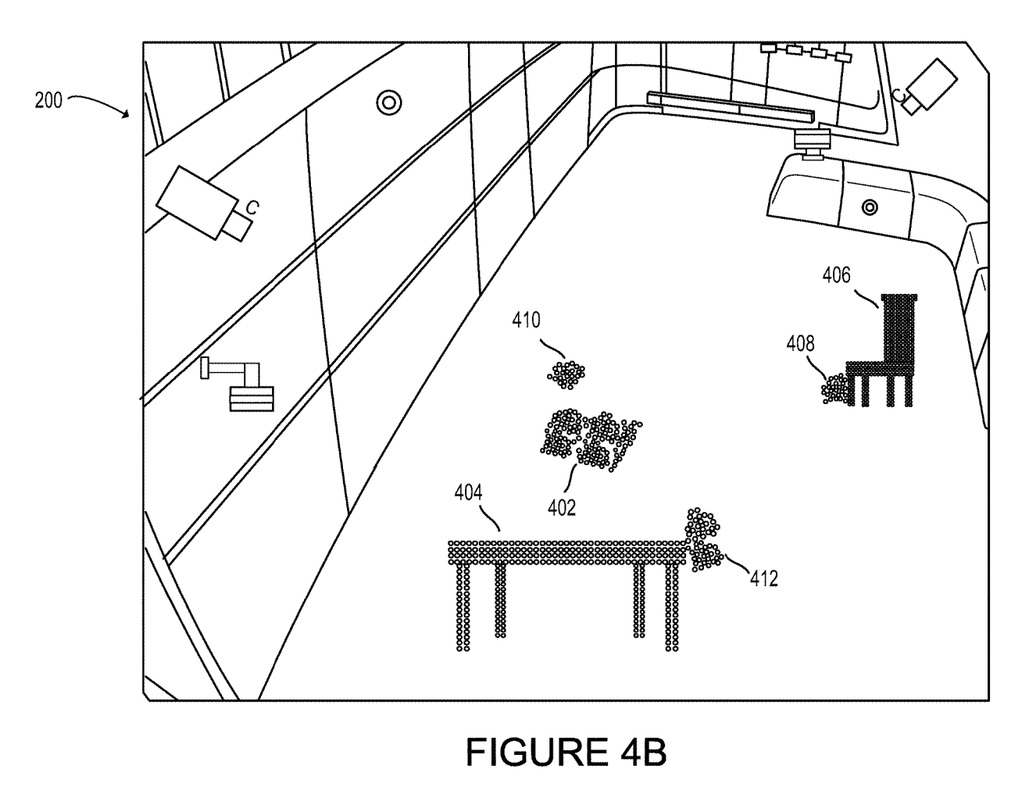
FIG. 4B depicts a second representation of the example environment for use to detect rigid shaped objects.

FIG. 4B depicts a second representation of the example environment for use to detect rigid shaped objects. Similar to the first representation, computing system 100 may utilize subsequent sensor data from a sensor or sensors (e.g., a LIDAR system) to determine the second representation depicting environment 200 at a time subsequent to the time associated with the first representation. In some implementations, computing system 100 may be further configured to determine additional representations subsequent to the first and second representations illustrated in FIGS. 4A-4B.

After determining the second representation illustrated in FIG. 4B, computing system 100 may be configured to use the second representation to further detect and analyze any clusters of data points that appear to maintain a rigid shaped configuration in both the first and second representations. Particularly, computing system 100 may determine whether previously detected clusters of data points maintain the same rigid shape configurations as previously detected in the first representation. Computing system 100 may also detect new clusters of data points that appear to display rigid shape characteristics. This way, computing system 100 may repeat one or more rigid shape detection processes (e.g., method 300) after obtaining additional sets of sensor data and determining subsequent representations that depict environment 200 at subsequent times to determine if the new clusters correspond to rigid shaped objects.

As shown in FIG. 4B, computing system 100 may determine that cluster 404 and cluster 406 appear to have maintained the same configuration and shape in the second representation as potentially detected within the first representation shown in FIG. 4A. Computing system 100 may use the first representation and second representation of environment 200 to measure movements of cluster 404 and cluster 406 to determine that the clusters 404-406 likely correspond to objects in environment 200 since the clusters maintain a rigid shape despite changing positions in environment 200. In some instances, computing system 100 may initially detect cluster 404 and cluster 406 if computing system 100 failed to detect clusters 404-406 in the first representation.

After determining that clusters 404-406 appear to maintain rigid shape configurations between the first and second representations, computing system 100 may further determine if clusters 404-406 likely correspond to objects in environment 200. Computing system 100 may use a database to perform one or more comparisons to determine if the detected rigid shapes depicted by data points in clusters 404-406 correspond to previously identified objects. For instance, computing system 100 may use information in the database to determine that cluster 404 includes data points depicting sensors measurements of a table and cluster 406 includes data points depicting sensor measurements of a chair located in environment 200.

In a further implementation, computing system 100 may query one or more computing devices positioned in environment 200 to obtain additional information regarding potential objects possibly depicted by clusters 404-406 in the first and second representations. For instance, computing system 100 may transmit a query to a computing device positioned within a threshold distance (e.g., 10 meters) from the location of the potential table according to data points in cluster 404. In some instances, computing system 100 may use additional information received from a computing device and/or other sensors operating in environment 200 to perform object recognition of the table and chair. Additionally, computing system 100 may also update a database that includes information regarding objects in environment 200 based on any information determined after performing the rigid shape object detection process.

Figure 4C:
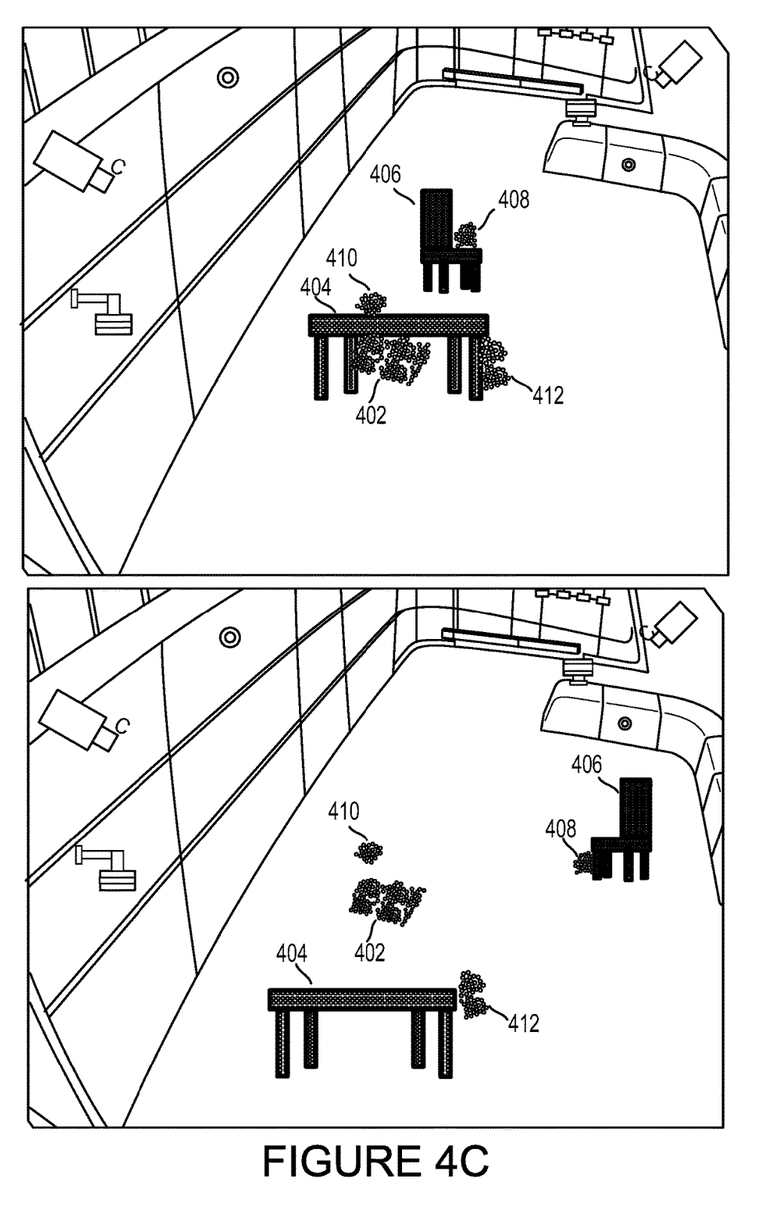
FIG. 4C depicts a detection of rigid shaped objects in the first representation and the second representation of the example environment.

FIG. 4C depicts a detection of rigid shaped objects in the first representation and the second representation of the example environment. Particularly, FIG. 4C shows the first representation positioned above the second representation to illustrate an example analysis that computing system 100 may perform to detect rigid shaped objects in environment 200. For instance, computing system 100 may use the first and second point cloud representation to perform method 300 or similar methods to detect objects in environment 200 that display rigid shape characteristics (e.g., a rigid, constant structure), which may involve detecting changes in position of clusters depicting rigid shapes characteristics between first positions in the first representation and second positions in the second representation. For instance, computing system 100 may detect and measure changes in the positions of data points in cluster 404 and data points in cluster 406 as shown in FIG. 4C. As such, through determining that the data points of cluster 404 and cluster 406 appear to maintain rigid shapes in different sets of measurements of environment 200 by sensors, computing system 100 may determine that cluster 404 and cluster 406 likely correspond to objects (e.g., a chair and table, respectively). After making this determination, computing system 100 may determine additional information regarding the newly detected objects and store information about the objects in memory for future reference.

In some instances, computing system 100 may also use the first representation and second representations of environment 200 to determine that some detected clusters, such as cluster 402, cluster 408, cluster 410, and cluster 412, likely do not correspond to rigid shaped objects. As such, computing system 100 may use processes to determine that these clusters correspond to noise, non-rigid objects, or objects no longer positioned in environment 200, among other possibilities. Computing system 100 may also use method 300 or other processes to determine whether detected cluster 412 corresponds to an object in environment 200. For instance, computing system 100 may further measure motion or changes of position of cluster 412 within subsequent representations of environment 200.

Figure 4D:
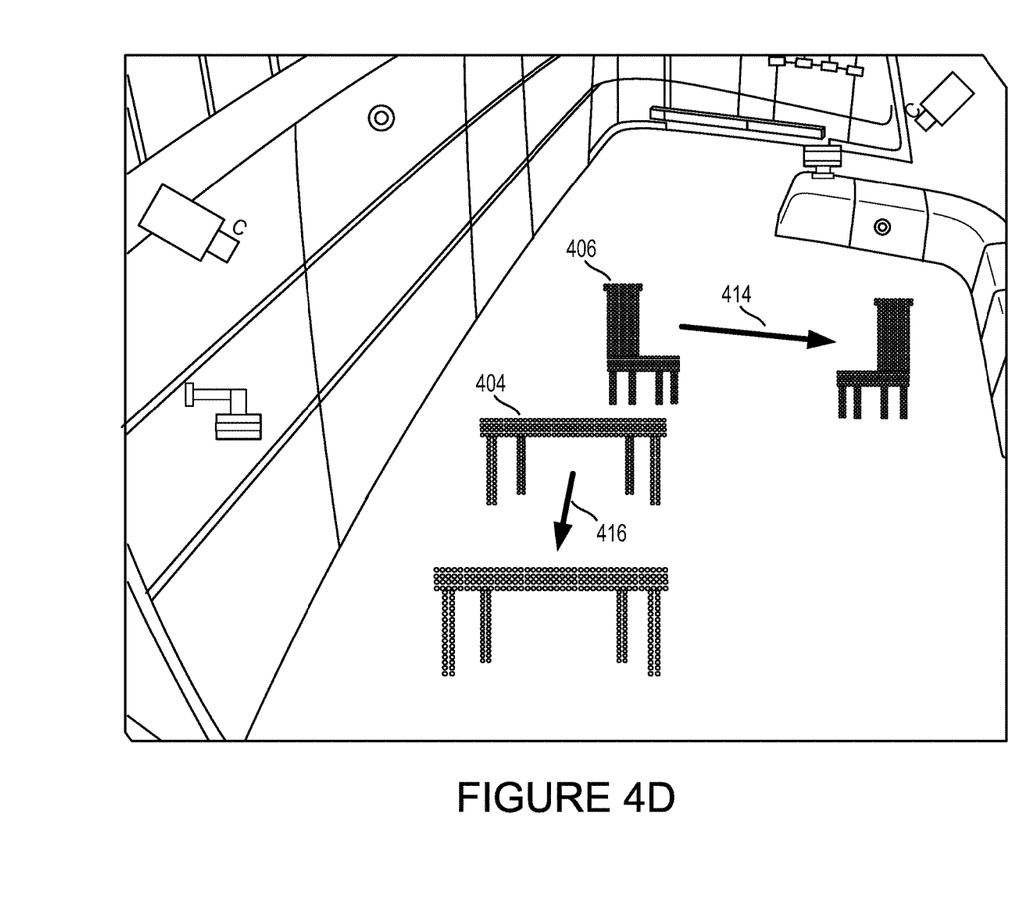
FIG. 4D depicts a compilation representation that shows transformations of rigid shaped objects in the example environment.

FIG. 4D depicts a compilation representation that illustrates transformation of rigid bodied objects in the example environment. As noted above, computing system 100 may measure motion of clusters of data points (e.g., cluster 404, cluster 406) that appear to display rigid shape characteristics across a series of determined representations depicting environment 200. As shown, computing system 100 may measure changes in position (depicted by arrow 414) of cluster 406 across the first and second representations and determine that data points within cluster 406 maintain a rigid shape in both representations despite transforming location and rotating orientation. This, in turn, may cause computing system 100 to determine that data points of cluster 406 likely correspond to an object (e.g., a chair) positioned environment 200.

Similarly, computing system 100 may measure the change in position (depicted by arrow 416) of data points in cluster 404 in the first and second representations. As shown, computing system 100 may determine that data points in cluster 404 maintain a rigid shape in a series of sensor data despite changing position in environment 200 likely indicates that data points in cluster 404 corresponds to an object (i.e., table). In some implementations, computing system 100 may perform further analysis (e.g., database comparison, computing device queries) to confirm that the data points in cluster 404 and cluster 406 correspond to objects.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A method comprising:
determining, at a computing system, using at least one depth sensor positioned within an environment, a first point cloud representation of the environment at a first time;
determining, at the computing system, using the at least one depth sensor, a second point cloud representation of the environment at a second time;
detecting a change in position of a rigid shape between a first position in the first point cloud representation and a second position in the second point cloud representation;
based on the detected change in position of the rigid shape, determining that the rigid shape is representative of an object in the environment;
based on determining that the rigid shape is representative of the object in the environment, performing a comparison between the rigid shape and a database having information indicative of rigid shapes corresponding to a plurality of objects;
based on the comparison indicating that the rigid shape fails to match a given rigid shape in the database, providing, by the computing system, a request for additional information regarding the object to a computing device positioned in the environment of the object;
in response to providing the request, receiving additional information that indicates a rigid shape and a size of the object from the computing device; and
storing, by the computing system, the additional information that indicates the rigid shape and the size of the object as corresponding to the object in the database.

2. The method of claim 1, wherein the at least one depth sensor is a LIDAR sensor having a fixed position in the environment.

3. The method of claim 1, wherein determining, at the computing system, using at least one depth sensor positioned within an environment, the first point cloud representation of the environment at the first time comprises:
determining the first point cloud representation of the environment at the first time using a LIDAR system having a plurality of LIDAR sensors at fixed positions in the environment.

4. The method of claim 1, wherein the second time is subsequent to the first time.

5. The method of claim 1, wherein detecting the change in position of the rigid shape between the first point cloud representation and the second point cloud representation comprises:
detecting a translation of the rigid shape between the first point cloud representation and the second point cloud representation.

6. The method of claim 1, wherein detecting the change in position of the rigid shape between the first point cloud representation and the second point cloud representation comprises:
detecting a rotation of the rigid shape between the first point cloud representation and the second point cloud representation.

7. The method of claim 1, wherein detecting the change in position of the rigid shape between the first point cloud representation and the second point cloud representation comprises:
detecting the rigid shape based on the rigid shape displaying non-dilation parameters between the first point cloud representation and the second point cloud representation.

8. The method of claim 1, further comprising:
based on the comparison, determining that the rigid shape is representative of the object in the environment.

9. The method of claim 1, further comprising:
providing, by the computing system, instructions to one or more systems in the environment based on determining that the rigid shape is representative of the object in the environment.

10. The method of claim 9, wherein providing instructions to the one or more systems in the environment based on determining that the rigid shape is representative of the object in the environment comprises:

providing instructions to a robotic device to obtain additional information corresponding to the detected object using one or more sensors positioned on the robotic device.

11. The method of claim 9, wherein providing instructions to the one or more systems in the environment based on determining that the rigid shape is representative of the object in the environment comprises:
providing instructions to a robotic device to change a position of the object in the environment.

12. The method of claim 9, further comprising:
based on determining that the rigid shape is representative of the object in the environment, providing instructions to a sensor system to obtain information corresponding to the object.

13. The method of claim 1, wherein storing, by the computing system, the additional information corresponding to the object comprises:
storing information indicative of the size, a position, and the rigid shape of the object.

14. A computing system, comprising:
one or more processors; and
a non-transitory computer-readable medium, configured to store instructions, that when executed by the one or more processors, cause the computing system to perform functions comprising:
determining, using at least one depth sensor positioned within an environment, a first point cloud representation of the environment at a first time;
determining, using the at least one depth sensor, a second point cloud representation of the environment at a second time;
detecting a change in position of a rigid shape between a first position in the first point cloud representation and a second position in the second point cloud representation;
based on the detected change in position of the rigid shape, determining that the rigid shape is representative of an object in the environment;
based on determining that the rigid shape is representative of the object in the environment, performing a comparison between the rigid shape and a database having information indicative of rigid shapes corresponding to a plurality of objects;
based on the comparison indicating that the rigid shape fails to match a given rigid shape in the database, providing a request for additional information regarding the object to a computing device positioned in the environment of the object;
in response to providing the request, receiving additional information that indicates a rigid shape and a size of the object from the computing device; and
storing the additional information that indicates the rigid shape and the size of the object as corresponding to the object in the database.

15. The system of claim 14, wherein providing the request for additional information regarding the object to the computing device positioned in the environment of the object comprises:
providing the request for additional information in an email or digital message to the computing device.

16. The system of claim 14, wherein providing the request for additional information regarding the object to the computing device positioned in the environment of the object comprises:
providing the request in an application operating on the computing device.

17. A non-transitory computer-readable medium configured to store instructions, that when executed by a computing system, cause the computing system to perform functions comprising:
determining, using at least one depth sensor positioned within an environment, a first point cloud representation of the environment at a first time;
determining, using the at least one depth sensor, a second point cloud representation of the environment at a second time;
detecting a change in position of a rigid shape between a first position in the first point cloud representation and a second position in the second point cloud representation;
based on the detected change in position of the rigid shape, determining that the rigid shape is representative of an object in the environment;
based on determining that the rigid shape is representative of the object in the environment, performing a comparison between the rigid shape and a database having information indicative of rigid shapes corresponding to a plurality of objects;
based on the comparison indicating that the rigid shape fails to match a given rigid shape in the database, providing a request for additional information regarding the object to a computing device positioned in the environment of the object;
in response to providing the request, receiving additional information that indicates a rigid shape and a size of the object from the computing device; and
storing the additional information that indicates the rigid shape and the size of the object as corresponding to the object in the database.

18. The non-transitory computer-readable medium of claim 17, further comprising:
determining, using the at least one depth sensor, a plurality of additional point cloud representations of the environment at a plurality of subsequent times;
detecting, using the plurality of additional point cloud representations of the environment at the plurality of subsequent times, a trend in motion of the rigid shape in the environment; and
based on the detected trend in motion of the rigid shape in the environment, determining that the rigid shape is representative of an object in the environment.

\* \* \* \* \*